US011864596B2

(12) United States Patent
Bilat et al.

(10) Patent No.: US 11,864,596 B2
(45) Date of Patent: Jan. 9, 2024

(54) METHODS FOR DETECTING HEATER CONDITIONS IN AN AEROSOL-GENERATING SYSTEM

(71) Applicant: Philip Morris Products S.A., Neuchatel (CH)

(72) Inventors: Stephane Bilat, Neuchatel (CH); Guillaume Colotte, Neuchatel (CH); Daryl Ng Wai Leong, Singapore (SG); Ho Keat Chang, Singapore (SG)

(73) Assignee: Philip Morris Products S.A., Neuchatel (CH)

( * ) Notice: Subject to any disclaimer, the term of this patent is extended or adjusted under 35 U.S.C. 154(b) by 573 days.

(21) Appl. No.: 17/057,885

(22) PCT Filed: May 29, 2019

(86) PCT No.: PCT/EP2019/063930
§ 371 (c)(1),
(2) Date: Nov. 23, 2020

(87) PCT Pub. No.: WO2019/229112
PCT Pub. Date: Dec. 5, 2019

(65) Prior Publication Data
US 2021/0195948 A1 Jul. 1, 2021

(30) Foreign Application Priority Data
May 30, 2018 (EP) .................................... 18175200

(51) Int. Cl.
*A24F 25/00* (2006.01)
*A24F 40/53* (2020.01)
(Continued)

(52) U.S. Cl.
CPC .............. *A24F 40/53* (2020.01); *A24F 40/46* (2020.01); *A24F 40/10* (2020.01); *A24F 40/42* (2020.01);
(Continued)

(58) Field of Classification Search
CPC .......... A24F 40/10; A24F 40/40; A24F 40/42; A24F 40/46; A24F 40/50; A24F 40/53; H05B 1/0244; H05B 2203/021
(Continued)

(56) References Cited

U.S. PATENT DOCUMENTS 9,423,152 B2 8/2016 Ampolini et al.
2014/0020693 A1 1/2014 Cochand et al.
(Continued)

FOREIGN PATENT DOCUMENTS

CN 203166461 U 8/2013
CN 107427080 A 12/2017
(Continued)

OTHER PUBLICATIONS

Japanese Office Action dated Mar. 27, 2023 in Japanese Patent Application No. 2020-562180 (with English Translation), 8 pages.
(Continued)

*Primary Examiner* — Khiem M Nguyen
(74) *Attorney, Agent, or Firm* — Oblon, McClelland, Maier & Neustadt, L.L.P.

(57) ABSTRACT

An electrically operated aerosol-generating system is provided, including: a heating element configured to heat an aerosol-forming substrate proximate to the heating element; a power supply; and electric circuitry in communication with the element and the power supply, and configured to regulate the supply of power during a plurality of discrete heating cycles in response to user inputs, determine a maximum electrical resistance of the heating element during
(Continued)

each heating cycle, calculate a rolling average value of the resistance for n preceding heating cycles, n being an integer greater than 1, compare the resistance with the calculated value, determine an adverse condition when the resistance is greater than the calculated value by more than a threshold value, the threshold value being stored in the memory, and control the power supplied based on whether there is the adverse condition or to provide an indication based on whether there is the adverse condition.

10 Claims, 7 Drawing Sheets

(51) Int. Cl.

| | |
|---|---|
| ***A24F 40/46*** | (2020.01) |
| *A24F 40/10* | (2020.01) |
| *A24F 40/42* | (2020.01) |
| *A24F 40/50* | (2020.01) |
| *H05B 1/02* | (2006.01) |

(52) U.S. Cl.
CPC ............ *A24F 40/50* (2020.01); *H05B 1/0244* (2013.01); *H05B 2203/021* (2013.01)

(58) Field of Classification Search
USPC .......................................................... 131/329
See application file for complete search history.

(56) References Cited

U.S. PATENT DOCUMENTS

| | | | |
|---|---|---|---|
| 2014/0270727 | A1 | 9/2014 | Ampolini et al. |
| 2014/0299141 | A1 | 10/2014 | Flick |
| 2017/0164658 | A1 | 6/2017 | Lin et al. |
| 2017/0251725 | A1 | 9/2017 | Buchberger et al. |

FOREIGN PATENT DOCUMENTS

| | | | |
|---|---|---|---|
| EP | 3 210 480 | A1 | 8/2017 |
| GB | 2529629 | A | 3/2016 |
| JP | 2014-501105 | A | 1/2014 |
| JP | 2014-530632 | A | 11/2014 |
| JP | 2016-517270 | A | 6/2016 |
| JP | 2017-521076 | A | 8/2017 |
| JP | 2017-532011 | A | 11/2017 |
| RU | 2 509 516 | C2 | 3/2014 |
| RU | 2 600 093 | C1 | 10/2016 |
| WO | WO 2012/085203 | A1 | 6/2012 |
| WO | WO 2013/060781 | A1 | 5/2013 |
| WO | WO 2013/098396 | A2 | 7/2013 |
| WO | WO 2016/150922 | A2 | 9/2016 |
| WO | WO 2018/019533 | A1 | 2/2018 |

OTHER PUBLICATIONS

Combined Russian Office Action and Search Report dated Sep. 1, 2022 in Russian Patent Application No. 2020142780/03 (with English translation of search report only), 9 pages.
International Search Report and Written Opinion dated Aug. 12, 2019 in PCT/EP2019/063930 filed on May 29, 2019.
Chinese Office Action and Search Report dated Sep. 2, 2023 issued in Chinese Patent Application No. 201980030646.5 filed May 29, 2019, with English Translation, total 21 pages.

METHODS FOR DETECTING HEATER CONDITIONS IN AN AEROSOL-GENERATING SYSTEM

The present specification relates to aerosol-generating systems that operate by heating. In particular the invention relates to the detection of abnormal or undesirable heater conditions in an electrically heated aerosol generating system.

In some aerosol-generating devices, a liquid aerosol-generating substrate is delivered from a liquid storage portion to an electrical heating element. Upon heating to a target temperature, the aerosol-generating substrate vaporises to form an aerosol. The liquid substrate is usually delivered to the heating element by a wick. When the amount of aerosol-generating substrate in the wick is depleted, the heating element may overheat, negatively affecting the aerosol quality.

WO2012/085203 discloses an aerosol-generating system that monitors a temperature rise at the heating element, wherein a rapid increase in heater temperature indicates drying out at the wick.

WO2016/1050922 and WO2018/019533 disclose more complex methods of detecting depletion of aerosol-generating substrate at the heating element. WO2016/1050922 teaches a system which relies on the ratio, or percentage, of a change in electrical resistance with respect to a predetermined initial electrical resistance. WO2018/019533 discloses a system that does not take into account of the initial heating resistance. Rather, it measures the absolute increase in electrical resistance during heating, and is configured to shut down when the increase in electrical resistance exceeds a predetermined threshold.

However, all of these techniques for detecting the depletion of aerosol-generating substrate still require raising the heater temperature substantially, in order to detect a change in the resulting electrical resistance. Moreover, some of these methods require an initial heater resistance to be detected.

According to a first aspect of the present invention there is provided an electrically operated aerosol-generating system comprising: a heating element for heating an aerosol-forming substrate proximate to the heating element; a power supply for supplying power to the heating element; and electric circuitry in communication with the heating element and the power supply, the electric circuitry comprising a memory and being configured to: regulate the supply of power to the heating element for a heating cycle period in response to a user input; determine a first derivative of the electrical resistance of the heating element with respect to time; determine that there is an adverse condition if said first derivative of the electrical resistance exceeds a threshold value stored in the memory during a heating cycle period at or subsequent to a predetermined time in the heating cycle period; and control power supplied to the heating element based on whether there is an adverse condition at the heating element or provide an indication based on whether there is an adverse condition at the heating element.

The electric circuitry determines an adverse condition, such as depletion of the aerosol-forming substrate or system malfunction, by monitoring the first derivative of electrical resistance of the heating element. The electric circuitry may be configured to determine depletion of liquid aerosol-forming substrate at the heating element. "Depletion" in this context means either an insufficient amount of aerosol-forming substrate is provided at the heating element, or a complete depletion of aerosol-forming substrate, e.g. empty cartridge. Either way, this may lead to a "dry" heating element, as opposed to a "wet" heating element that is saturated with liquid aerosol-forming substrate. For example, when the cartridge is empty or nearly empty, insufficient liquid aerosol-forming substrate may be supplied to the heating element. This may mean that the aerosol created does not have the desired properties, for example, aerosol particle size or chemical composition. This may result in a poor experience for the user.

The electric circuitry may, upon detecting the adverse condition, cease the power supply. This is advantageous because the user can then no longer use the aerosol generating system once there is detected drying out at the heating element. This may avoid creation of an aerosol which does not have the desired properties. And therefore, this may avoid a poor experience for the user. The electric circuitry may be arranged to deactivate the heating element by blowing an electrical fuse between the heating element and an electric power supply. The electric circuitry may be arranged to deactivate the heating element by switching off a switch between the heating element and an electric power supply. Alternative methods of deactivating the heating element will be apparent to the skilled person. The electric circuitry may, in some circumstances, be configured to reduce, but not completely stop, the supply of power to the heating element on detection of an adverse condition.

The electric circuitry may, alternatively or in addition, provide an indication to the user to alert the user of the adverse condition. The indication may be one or more of an audio indication, a visual indication, a mechanical indication such as vibrational, an olfactory indication, or any other indicating means known to the person skilled in the art. Then the user can prepare to replace or refill the cartridge.

In general, the less aerosol-forming substrate is delivered to the heater for vaporisation, the higher the temperature of the heating element will be for a given applied power. This is because the energy for heating and vaporising the aerosol-forming substrate would instead be applied to heat the heating element. Accordingly, the electrical resistance at the heating element may increase upon depletion of the aerosol-forming substrate.

The electric circuitry may therefore determine the adverse condition by monitoring a first derivative of electrical resistance of the heating element for a given power supply. For example, an adverse condition may be determined upon detecting a sudden surge in electrical resistance. Advantageously, this may enable a rapid detection of the adverse condition. This is because an adverse condition can be readily determined even before the heater temperature has reached a predetermined threshold, as disclosed in the prior art systems. This may provide a safeguard against overheating at the heating element.

Optionally, the predetermined time period is a fixed time period following a start of the heating cycle period, the fixed time period being stored in the memory. The predetermined time period may be a duration typical for the heating element to heat up from an ambient temperature to an operating temperature. Whereas the operating temperature may be a temperature where the aerosol-forming substrate vaporises. That is, the determination of adverse condition may only take place once aerosol-forming substrate starts to be vaporised at the heating element. Therefore, said determination may not take into account the temperature rise during the heating of heating element. For example, a rapid and perhaps inconsistent temperature rise may be expected during such heating up period, but such temperature rise may not necessarily be attributed to a lack of aerosol-forming substrate. As a result, the determination may be made more accurate if it is carried out once the heating element has reached an operating temperature.

The time it takes for the heating element to reach to its operating temperature may vary. For example, a higher ambient temperature, or subsequent puffs in a session with a warmed heating element, may only require a shorter predetermined time to reach a target temperature. Therefore optionally, the electric circuitry is configured to calculate a second derivative of the electrical resistance of the heating element with respect to time, and wherein the predetermined time is when the second derivative exceeds or is equal to a second derivative threshold value. Advantageously, the second derivative may allow the predetermined time period to be actively determined during each of the heating cycles. This may provide a more reliable determination of an adverse condition.

Optionally, the second derivative threshold value is zero. This may advantageously allow the electric circuitry to pinpoint the moment when the heating element has reached its operating temperature. This is because a zero second derivative indicates there is no longer a temperature change at the heating element. Therefrom, any further sudden change in heater temperature can only be attributed to an adverse condition.

According to a second aspect of the invention, there is provided an electrically operated aerosol-generating system comprising:

a heating element for heating an aerosol-forming substrate proximate to the heating element;

a power supply for supplying power to the heating element; and electric circuitry in communication with the heating element and the power supply, the electric circuitry being configured to:

regulate the supply of power to the heating element for a heating cycle period in response to a user input;

determine a second derivative of the electrical resistance with respect to time; and determine an adverse condition when the second derivative exceeds or is equal to a second derivative threshold value; and control power supplied to the heating element based on whether there is an adverse condition at the heating element or to provide an indication based on whether there is an adverse condition at the heating element.

The second derivative threshold value may be zero. The second derivative threshold value may be a positive value.

According to a third aspect of the present invention, there is provided an electrically operated aerosol-generating system comprising: a heating element for heating an aerosol-forming substrate proximate to the heating element; a power supply for supplying power to the heating element; and electric circuitry in communication with the heating element and the power supply, the electric circuitry comprising a memory and being configured to: regulate the supply of power to the heating element during a plurality of discrete heating cycles in response to user inputs; determine a maximum electrical resistance of the heating element during each heating cycle; calculate a rolling average value of maximum electrical resistance of the heating element for n preceding heating cycles, wherein n is an integer greater than 1; compare the electrical resistance of the heating element with the calculated rolling average value; determine an adverse condition when the electrical resistance is greater than that the rolling average value by more than a threshold value, said threshold value being stored in the memory; and control power supplied to the heating element based on whether there is an adverse condition at the heating element or to provide an indication based on whether there is an adverse condition at the heating element.

For a given power supply to the heating element, the maximum temperature at the heating element is limited by the amount of available aerosol-forming substrate. This is because of the latent heat of vaporisation of the aerosol-forming substrate. Therefore the maximum electrical resistance at the heating element may be related to the amount of aerosol-forming substrate available at the heating element. For example, a lack of aerosol-forming substrate may result in a significant rise in maximum electrical resistance as detected over a plurality of successive heating cycles. Therefore empty cartridges may be detected if an increase in maximum electrical resistance from one puff to the next exceeds a threshold value.

However the supply of aerosol-forming substrate at the heating element may gradually reduce over the lifetime of a cartridge. As the aerosol-forming substrate starts to deplete the maximum resistance of the heating element may also progressively increase over successive puffs. Therefore during an adverse condition there may be no substantial difference in the maximum resistance detected between two successive puffs. This means an empty cartridge may not be quickly detectable.

Therefore advantageously, maximum resistance as detected during a puff may be compared with a rolling average of maximum resistance detected over at least two preceding puffs. This ensures that any gradual increase in maximum resistance over the plurality of preceding puffs does not prevent the adverse condition being detected.

Optionally, n is between 2 and 5.

Optionally, the electric circuitry is configured to control power or to provide an indication of an adverse condition, if an adverse condition is determined over two consecutive heating cycles. This may reduce false positives arising from fluctuations in the detected maximum resistance due to other factors.

Optionally, the electric circuitry is configured to determine an adverse condition only after a predetermined start time period has lapsed following the start of the heating cycle, said predetermined start time period being stored in the memory.

Optionally, the electrical circuitry is configured to determine if there is an adverse condition during each heating cycle.

As used herein, an 'electrically operated aerosol-generating system' means a system that generates an aerosol from one or more aerosol-forming substrates.

As used herein, the term 'aerosol-forming substrate' means a substrate capable of releasing volatile compounds that may form an aerosol. Such volatile compounds may be released by heating the aerosol-forming substrate.

The aerosol-forming substrate may be contained in a cartridge. The system may comprise a device to which the cartridge connects for heating the one or more aerosol-forming substrates. An electrical aerosol-generating system may include additional components, such as a charging unit for recharging an on-board electric power supply in an electrically operated aerosol-generating device. An advantage of providing a cartridge is that the aerosol-forming substrate is protected from ambient environment. In some embodiments, ambient light cannot enter the cartridge as well, so that the light-induced degradation of the aerosol-forming substrate may be avoided. Moreover, a high level of hygiene can be maintained.

The aerosol-forming substrate may be contained in a refillable liquid storage portion in the aerosol-generating device. The aerosol-forming substrate may be contained in a refillable cartridge in the aerosol-generating system. Preferably the aerosol-forming substrate is contained a disposable cartridge in the aerosol-generating system. Said cartridge may be replaced after a single session of use, or it may be replaced after a plurality of sessions of use. This may allow the user to replace a depleted cartridge in a safe and efficient manner.

The aerosol-forming substrate may be in a liquid phase at room temperature. As used herein, the terms "liquid" and "solid" refer to a state of the aerosol-forming substrate at room temperature. The aerosol-forming substrate may be a flowable liquid at room temperature. For a liquid aerosol-forming substrate, certain physical properties, for example the vapour pressure or viscosity of the substrate, are chosen to be suitable for use in the aerosol generating system.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former may be any suitable known compound or mixture of compounds that, in use, facilitates formation of a dense and stable aerosol and that is substantially resistant to thermal degradation at the operating temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants.

For the liquid aerosol-forming substrate, certain physical properties, for example the vapour pressure or viscosity of the substrate, are chosen in a way to be suitable for use in the aerosol generating system. The liquid preferably comprises a tobacco-containing material comprising volatile tobacco flavour compounds which are released from the liquid upon heating. Alternatively, or in addition, the liquid may comprise a non-tobacco material. The liquid may include water, ethanol, or other solvents, plant extracts, nicotine solutions, and natural or artificial flavours. Preferably, the liquid further comprises an aerosol former. Examples of suitable aerosol formers are glycerine and propylene glycol.

As used herein, the term "heating element" means an electrical heating element powered by the on-board electric power supply. The electrical heating element may comprise a single heating element. Alternatively, the heating element may comprise more than one discrete heating element, for example two, or three, or four, or five, or six or more heating elements. The heating element or heating elements may be arranged appropriately so as to most effectively heat the liquid aerosol-forming substrate.

The heating element may be an resistive heating element. The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. In composite materials, the electrically resistive material may optionally be embedded in, encapsulated or coated with an insulating material or vice-versa, depending on the kinetics of energy transfer and the external physico-chemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company.

The resistive heating element may take the form of a mesh, array or fabric of electrically conductive filaments. The electrically conductive filaments may define interstices between the filaments and the interstices may have a width of between 10 μm and 100 μm. The electrically conductive filaments may form a mesh of size between 160 and 600 Mesh US (+/−10%) (i.e. between 160 and 600 filaments per inch (+/−10%)). The width of the interstices is preferably between 75 μm and 25 μm. The percentage of open area of the mesh, which is the ratio of the area of the interstices to the total area of the mesh is preferably between 25 and 56%. The mesh may be formed using different types of weave or lattice structures. Alternatively, the electrically conductive filaments consist of an array of filaments arranged parallel to one another. The electrically conductive filaments may have a diameter of between 10 μm and 100 μm, preferably between 8 μm and 50 μm, and more preferably between 8 μm and 39 μm. The filaments may have a round cross section or may have a flattened cross-section.

The area of the mesh, array or fabric of electrically conductive filaments may be small, preferably less than or equal to 25 $mm^2$, allowing it to be incorporated in to a handheld system. The mesh, array or fabric of electrically conductive filaments may, for example, be rectangular and have dimensions of 5 mm by 2 mm. Preferably, the mesh or array of electrically conductive filaments covers an area of between 10% and 50% of the area of the heater assembly. More preferably, the mesh or array of electrically conductive filaments covers an area of between 15 and 25% of the area of the heater assembly.

The filaments may be formed by etching a sheet material, such as a foil. This may be particularly advantageous when the heater assembly comprises an array of parallel filaments. If the heating element comprises a mesh or fabric of filaments, the filaments may be individually formed and knitted together.

Preferred materials for the electrically conductive filaments are 304, 316, 304L, and 316L stainless steel.

Alternatively to a mesh arrangement, the at least one electric heating element may take the form of a resistive heater coil, or a casing or substrate having different electro-conductive portions, or an electrically resistive metallic tube. The heater may be arranged to circumscribe at least a portion of the cartridge when the cartridge is received within a cavity of the aerosol-generating device. The cartridge may incorporate a disposable heating element. Alternatively, one or more heating needles or rods that run through the liquid aerosol-forming substrate may also be suitable. Alternatively, the at least one electric heating element may comprise a flexible sheet of material. Other alternatives include a heating wire or filament, for example a Ni—Cr (Nickel-Chrome), platinum, tungsten or alloy wire, or a heating plate. Optionally, the heating element may be deposited in or on a rigid carrier material.

The aerosol-forming substrate is delivered to and be heated proximate to the at least one heating element. The at least one heating element may heat the aerosol-forming substrate by means of conduction. The heating element may be at least partially in contact with the substrate. The heat from the heating element may be conducted to the substrate by means of a heat conductive element. Alternatively or in addition, the at least one heating element may transfer heat to the incoming ambient air that is drawn through the electrically operated aerosol generating system during use, which in turn heats the aerosol-forming substrate. The ambient air may be heated before passing through the aerosol-forming substrate. The ambient air may be first drawn through the substrate and then heated.

Temperature sensing may be based upon measuring at least the electrical resistance of the resistive heating element. In other words, the resistive heating element may function as a temperature sensor. For example, if the at least one heating element has suitable characteristics of the temperature coefficient of resistance, measuring the electrical resistance of the at least one heating element will allow the temperature of the heating element to be ascertained. The electric circuitry may be arranged to measure the electrical resistance of the at least one heating element by measuring the current through the at least one heating element and the voltage across the at least one heating element and determining the electrical resistance of the at least one heating element from the measured current and voltage. In that case, the electric circuitry may comprise a resistor, having a known resistance, in series with the at least one heating element and the electric circuitry may be arranged to measure the current through the at least one heating element by measuring the voltage across the known-resistance resistor and determining the current through the at least one heating element from the measured voltage and the known resistance. Therefore, it may not be necessary to include a dedicated temperature sensor, which may take up valuable space in the aerosol generating system and may also be costly. It is emphasized that the electrical resistance, in this embodiment, is used both as a heating element and a sensor.

The electrically operated aerosol generating system may further comprise a capillary wick for conveying the liquid aerosol-forming substrate from the cartridge to the heating element. This may reduce the number of moving parts in the aerosol-generating device, and thus it may improve reliability, as well as reducing weight and cost.

Optionally, the capillary wick is arranged to be in contact with liquid in the cartridge. Optionally, the capillary wick extends into the cartridge. In that case, in use, liquid may be transferred from the cartridge to the heating element by capillary action in the capillary wick. In one embodiment, the capillary wick may comprise a first end and a second end, the first end may extend into the cartridge for contact with liquid therein and the heating element may be arranged to heat liquid in the second end. When the heating element is activated, the liquid at the second end of the capillary wick may be vaporized by the at least one heating element to form the supersaturated vapour. The supersaturated vapour may be mixed with and carried in the air flow. During the flow, the vapour condenses to form the aerosol and the aerosol may be carried towards the mouth of a user. The liquid aerosol-forming substrate may have physical properties, including viscosity and surface tension, which allow the liquid to be transported through the capillary wick by capillary action.

The capillary wick may have a fibrous or spongy structure. The capillary wick preferably comprises a bundle of capillaries. For example, the capillary wick may comprise a plurality of fibres or threads or other fine bore tubes. The fibres or threads may be generally aligned in the longitudinal direction of the aerosol generating system. Alternatively, the capillary wick may comprise sponge-like or foam-like material formed into a rod shape. The rod shape may extend along the longitudinal direction of the aerosol generating system. The structure of the wick may form a plurality of small bores or tubes, through which the liquid can be transported by capillary action. The capillary wick may comprise any suitable material or combination of materials. Examples of suitable materials are capillary materials, for example a sponge or foam material, ceramic- or graphite-based materials in the form of fibres or sintered powders, foamed metal or plastics material, a fibrous material, for example made of spinned or extruded fibres, such as cellulose acetate, polyester, or bonded polyolefin, polyethylene, terylene or polypropylene fibres, nylon fibres or ceramic. The capillary wick may have any suitable capillarity and porosity so as to be used with different liquid physical properties. The liquid may have physical properties, including but not limited to viscosity, surface tension, density, thermal conductivity, boiling point and vapour pressure, which allow the liquid to be transported through the capillary device by capillary action.

Optionally, the at least one heating element is in the form of a heating wire or filament encircling, and optionally supporting, the capillary wick. The capillary properties of the wick, combined with the properties of the liquid, may ensure that, during normal use when there is plenty of aerosol-forming substrate, the wick is always wet in the heating area.

The capillary wick and the heating element, and optionally the cartridge, may be removable from the aerosol generating system as a single component.

Optionally, the electrical operated aerosol-generating system further comprises a mouthpiece on which a user can puff to draw aerosol out of the system, wherein the electric circuitry comprises a puff detector for detecting when a user is puffing on the system as a user input, and wherein the electric circuitry is configured to supply power from the power supply to the heating element when a puff is detected by the puff detector. The puff detector may form the user input device at the aerosol-generating device. That is, the user may not need to depress a mechanical button in order to start a heating cycle.

The mouthpiece may be configured for engagement with the housing of the aerosol-generating device or the cartridge. Optionally, the mouthpiece is configured for engagement with the aerosol-generating device, the combination of the aerosol-generating device and the mouthpiece may simulate the shape and dimensions of a combustible smoking article, such as a cigarette, a cigar, or a cigarillo. Advantageously, in such embodiments the combination of the aerosol-generating device and the mouthpiece may simulate the shape and dimensions of a cigarette.

The mouthpiece may be designed to be disposed of once the aerosol-forming substrate in the cartridge is depleted.

The mouthpiece may be designed to be reusable. In embodiments in which the mouthpiece is designed to be reusable, the mouthpiece may advantageously be configured to be removably attached to the cartridge or the housing of the aerosol-generating device.

Optionally, the electric circuitry comprises a microprocessor and more preferably a programmable microprocessor. The system may comprise a data input port or a wireless receiver to allow software to be uploaded onto the microprocessor. The electric circuitry may comprise additional electrical components.

Optionally, cartridges having different properties can be used with the device. For example, two different cartridges having different sized heating elements may be provided with the device. For example, a heating element with a higher power rating may be used to deliver more aerosol for users. A cartridge with a higher capacity may be used to reduce the frequency of cartridge replacement.

Preferably, the aerosol generating device comprises a housing. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The power supply may be any suitable power supply, for example a DC voltage source such as a battery. The power supply may be a Lithium-ion battery, a Nickel-metal hydride battery, a Nickel cadmium battery, or a Lithium based battery, for example a Lithium-Cobalt, a Lithium-Iron-Phosphate, Lithium Titanate or a Lithium-Polymer battery.

Optionally, the power supply may include a rechargeable lithium ion battery. The electrical power supply may comprise another form of charge storage device such as a capacitor. The electrical power supply may require recharging. The electrical power supply may have a capacity that allows for the storage of enough energy for one or more uses of the aerosol-generating device. For example, the electrical power supply may have sufficient capacity to allow for the continuous generation of aerosol for a period of around six minutes, corresponding to the typical time taken to smoke a conventional cigarette, or for a period that is a multiple of six minutes. In another example, the electrical power supply may have sufficient capacity to allow for a predetermined number of puffs or discrete activations.

The electric circuitry may be configured to commence a supply of electrical power from the electrical power supply to the heater at the start of a heating cycle. The electric circuitry may be configured to terminate a supply of electrical power from the electrical power supply to the heater at the end of a heating cycle.

The electric circuitry may be configured to provide a continuous supply of electrical power from the electrical power supply to the heater.

The electric circuitry may be configured to provide an intermittent supply of electrical power from the electrical power supply to the heater. The electric circuitry may be configured to provide a pulsed supply of electrical power from the electrical power supply to the heater.

Advantageously, a pulsed supply of electrical power to the heater may facilitate control of the total output from the heater during a time period. Advantageously, controlling a total output from the heater during a time period may facilitate control of temperature.

The electric circuitry may be configured to vary the supply of electrical power from the electrical power supply to the heater. The electric circuitry may be configured to vary a duty cycle of the pulsed supply of electrical power. The electric circuitry may be configured to vary at least one of a pulse width and a period of the duty cycle.

Optionally, the aerosol generating system is portable. The aerosol generating system may be a smoking system and may have a size comparable to a conventional cigar or cigarette. The smoking system may have a total length between approximately 30 mm and approximately 150 mm. The smoking system may have an external diameter between approximately 5 mm and approximately 30 mm.

Optionally, the aerosol-generating device comprises a user input device. The user input device may comprise at least one of a push-button, a scroll-wheel, a touch-button, a touch-screen, and a microphone. The user input device may allow a user to control one or more aspects of the operation of the aerosol-generating device. The user input device may allow a user to activate a supply of electrical power to the heater, to deactivate a supply of electrical power to the heater, or both.

According to a fourth aspect of the invention, there is provided a method of controlling the supply of power to a heating element in an electrically operated aerosol-generating system, comprising: regulating the supply of power to the heating element for a heating cycle period in response to a user input; determining a first derivative of the electrical resistance of the heating element with respect to time; determining that there is an adverse condition if said first derivative of the electrical resistance exceeds a threshold value stored in the memory during a heating cycle period at or subsequent to a predetermined time in the heating cycle period; and controlling power supplied to the heating element based on whether there is an adverse condition at the heating element or providing an indication based on whether there is an adverse condition at the heating element.

According to a fifth aspect of the invention, there is provided a method of controlling the supply of power to a heating element in an electrically operated aerosol-generating system, comprising: regulating the supply of power to the heating element for a heating cycle period in response to a user input; determining a second derivative of the electrical resistance with respect to time; determining an adverse condition when the second derivative exceeds or is equal to a second derivative threshold value; and controlling power supplied to the heating element based on whether there is an adverse condition at the heating element or providing an indication based on whether there is an adverse condition at the heating element.

According to a sixth aspect of the invention, there is provided a method of controlling the supply of power to a heating element in an electrically operated aerosol-generating system, comprising: regulating the supply of power to the heating element during a plurality of discrete heating cycles in response to user inputs; determining a maximum electrical resistance of the heating element during each heating cycle; calculating a rolling average value of maximum electrical resistance of the heating element for n preceding heating cycles, wherein n is an integer greater than 1; comparing the electrical resistance of the heating element with the calculated rolling average value; determining an adverse condition when the electrical resistance is greater than that the rolling average value by more than a threshold value, said threshold value being stored in the memory; and controlling power supplied to the heating element based on whether there is an adverse condition at the heating element or providing an indication based on whether there is an adverse condition at the heating element.

According to a seventh aspect of the invention, there is provided a computer program product directly loadable into the internal memory of a microprocessor comprising software code portions for performing the steps as disclosed above, when said product is run on a programmable electric circuitry in an electrically operated aerosol-generating system, the system comprising a heating element for heating an aerosol-forming substrate and a power supply for supplying power to the heating element, the electric circuitry connected to the electric heater and the power supply, the electric circuitry being configured to detect an electrical resistance of the heating element.

For the avoidance of doubt, features described above in relation to one aspect of the invention may also be applicable to other aspects of the invention. Furthermore, the features described in relation to one aspect may be used in combination with the features of another aspect.

Embodiments of the invention will now be described, by way of example only, with reference to the accompanying drawings, in which:

FIGS. 1*a*, 1*b*, 1*c* and 1*d* are schematic illustrations of a system in accordance with an embodiment of the invention;

FIGS. 1*a* to 1*d* are schematic illustrations of an electrically heated aerosol-generating system in accordance with an embodiment of the invention. The aerosol-generating system comprises an aerosol-generating device 10 and a cartridge 20.

Figure 1A:
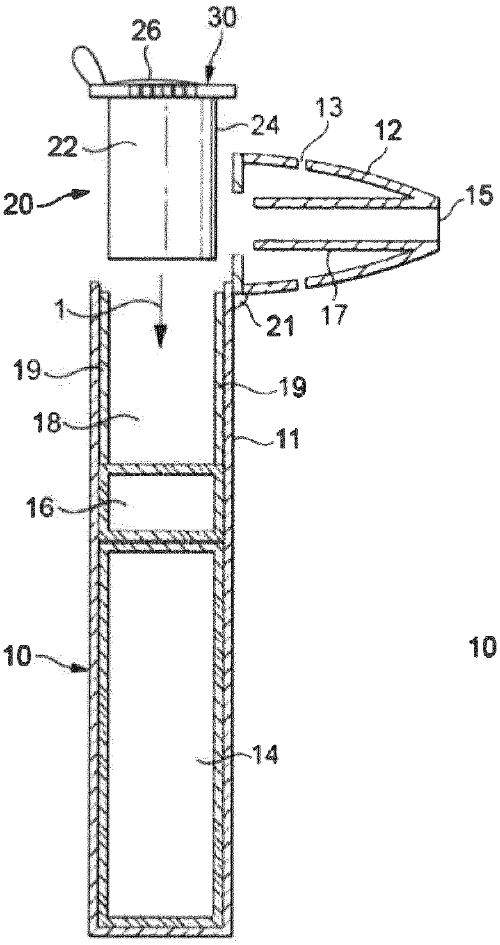

The cartridge 20 contains an aerosol-forming substrate in a cartridge housing 24 and is configured to be received in a cavity 18 within the device. The cartridge 20 is a disposable cartridge. A user may replace the cartridge 20 once the aerosol-forming substrate in the cartridge is depleted. The cartridge comprises a removable seal 26 for providing a hermetic seal to the cartridge housing 24. This allows the aerosol-forming substrate as contained in the cartridge housing 24 be shielded from the environment prior to its first use. FIG. 1*a* shows the cartridge 20 just prior to insertion into the device, with the arrow 1 in FIG. 1*a* indicating the direction of insertion of the cartridge.

The aerosol-generating device 10 is portable and has a size comparable to a conventional cigar or cigarette. The device 10 comprises a main body 11 and a mouthpiece portion 12. The main body 11 contains a battery 14, such as a lithium iron phosphate battery, electric circuitry 16 and a cavity 18. The electric circuitry 16 comprises a programmable microprocessor. The mouthpiece portion 12 is connected to the main body 11 by a hinged connection 21 and can move between an open position as shown in FIG. 1*a* and a closed position as shown in FIG. 1*d*. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, a user sucks or puffs on the outlet to draw air from the air inlets 13, through the mouthpiece portion to the outlet 15, and thereafter into the mouth or lungs of the user. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

Figure 1B:
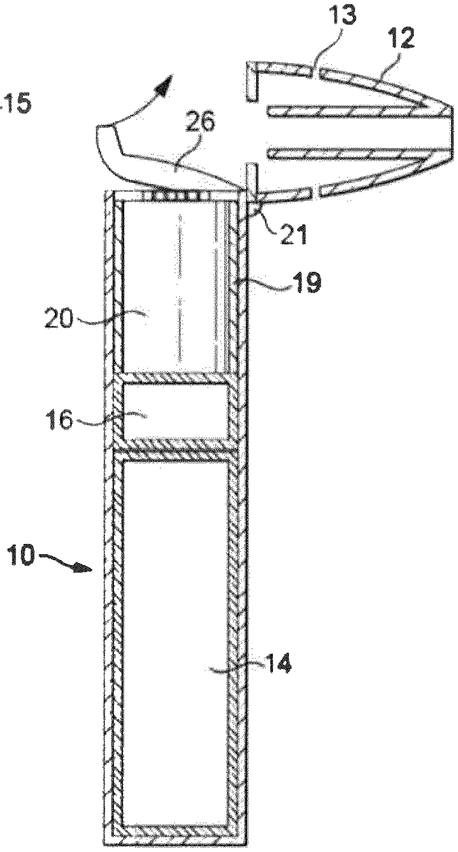

FIG. 1*b* shows the system of FIG. 1*a* with the cartridge inserted into the cavity 18, and the removable seal 26 being removed. In this position, the electrical connectors rest against the electrical contacts on the cartridge.

Figure 1C:
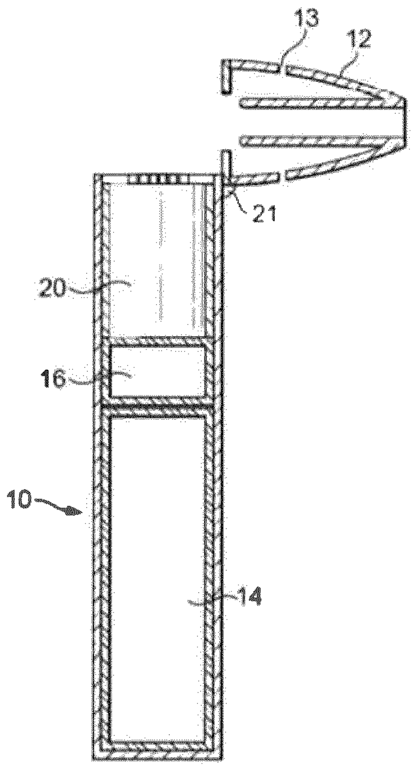
Figure 1D:
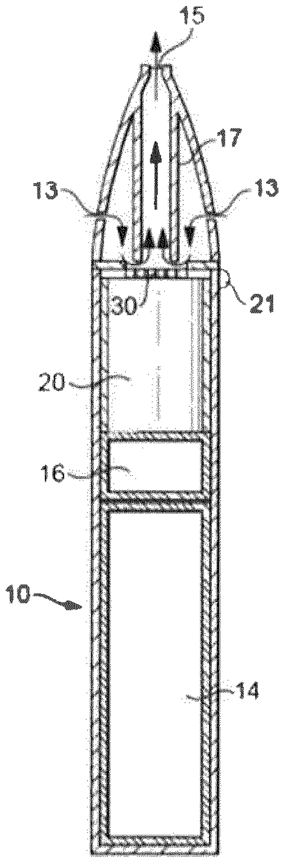

FIG. 1*c* shows the system of FIG. 1*b* with the releasable seal 26 removed and the mouthpiece portion 12 being moved to a closed position.

FIG. 1*d* shows the system of FIG. 1*c* with the mouthpiece portion 12 in the closed position. The mouthpiece portion 12 is retained in the closed position by a clasp mechanism. The mouthpiece portion 12 in a closed position retains the cartridge in electrical contact with the electrical connectors 19 so that a good electrical connection is maintained in use, whatever the orientation of the system is.

Figure 2:
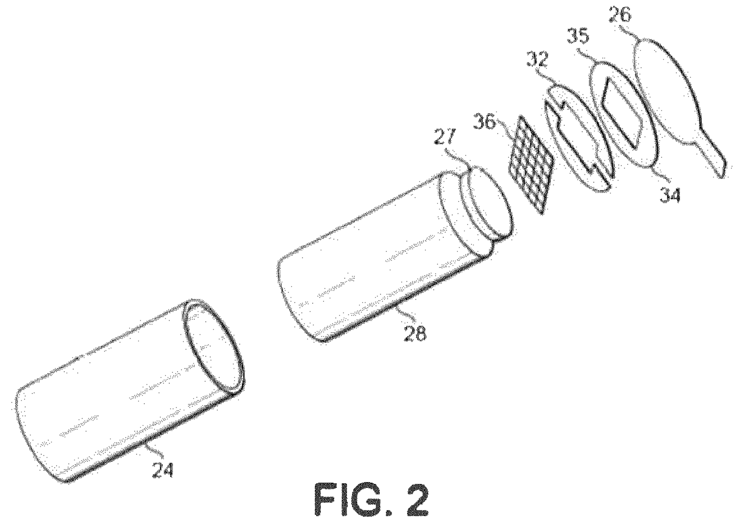
FIG. 2 is an exploded view of a cartridge for use in a system as shown in FIGS. 1*a* to 1*d;*

FIG. 2 is an exploded view of the cartridge 20. The cartridge housing 24 that has a size and shape selected to be received into the cavity 18. The housing contains capillary material 27, 28 that is soaked in a liquid aerosol-forming substrate. In this example the aerosol-forming substrate comprises 39% by weight glycerine, 39% by weight propylene glycol, 20% by weight water and flavourings, and 2% by weight nicotine. A capillary material is a material that actively conveys liquid from one end to another, based on relative differences in liquid concentration. The capillary material may be made from any suitable material. In this example the capillary material is formed from polyester.

The cartridge housing 24 has an open end to which a heater assembly 30 is fixed. The heater assembly 30 comprises a substrate 34 having an aperture 35 formed in it, a pair of electrical contacts 32 fixed to the substrate and separated from each other by a gap 33, and a plurality of electrically conductive heater filaments 36 spanning the aperture and fixed to the electrical contacts on opposite sides of the aperture 35.

The heater assembly 30 is covered by the releasable seal 26. The releasable seal 26 comprises a liquid impermeable plastic sheet that is glued to the heater assembly 30 but which can be easily peeled off. A tab is provided on the side of the releasable seal 26 to allow a user to grasp the releasable seal 26 when peeling it off. It will be apparent to one of ordinary skill in the art that although gluing is described as the method to a secure the impermeable plastic sheet to the heater assembly, other methods familiar to those in the art may also be used including heat sealing or ultrasonic welding, so long as the cover may easily be removed by a consumer.

There are two separate capillary materials 27, 28 in the cartridge of FIG. 2. A disc of a first capillary material 27 is provided to contact the heater element 36, 32 in use. A larger body of a second capillary material 28 is provided on an opposite side of the first capillary material 27 to the heater assembly. Both the first capillary material and the second capillary material retain liquid aerosol-forming substrate. The first capillary material 27, which contacts the heater element, has a higher thermal decomposition temperature (at least 160° C. or higher such as approximately 250° C.) than the second capillary material 28. The first capillary material 27 effectively acts as a spacer separating the heater element 36, 32 from the second capillary material 28 so that the second capillary material is not exposed to temperatures above its thermal decomposition temperature. The thermal gradient across the first capillary material is such that the second capillary material is exposed to temperatures below its thermal decomposition temperature. The second capillary material 28 may be chosen to have superior wicking performance to the first capillary material 27, may retain more liquid per unit volume than the first capillary material and may be less expensive than the first capillary material. In this example the first capillary material is a heat resistant material, such as a fiberglass or fiberglass containing material and the second capillary material is a polymer such as suitable capillary material. Exemplary suitable capillary materials include the capillary materials discussed herein and in alternative embodiments may include high density polyethylene (HDPE), or polyethylene terephthalate (PET).

Figure 3:
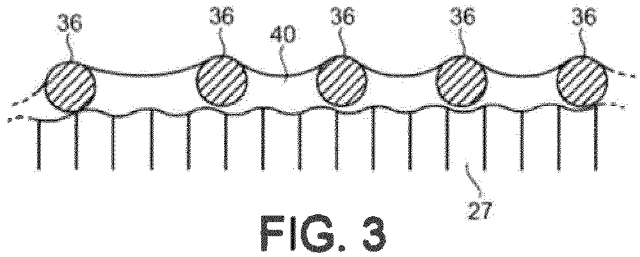
FIG. 3 is a detailed view of heater filaments of a heater assembly in the cartridge as shown in FIG. 2, showing a meniscus of liquid aerosol-forming substrate between the filaments.

The capillary material 27, 28 is advantageously oriented in the housing 24 to convey liquid to the heater assembly 30. When the cartridge is assembled, the heater filaments 36, may be in contact with the capillary material 27 and so aerosol-forming substrate can be conveyed directly to the mesh heater. FIG. 3 is a detailed view of the filaments 36 of the heater assembly 30, showing a meniscus 40 of liquid aerosol-forming substrate between the heater filaments 36. It can be seen that aerosol-forming substrate contacts most of the surface of each filament 36 so that most of the heat generated by the heater assembly 30 passes directly into the aerosol-forming substrate.

So, in normal operation, liquid aerosol-forming substrate contacts a large portion of the surface of the heater filaments 36. However, when most of the liquid substrate in the cartridge has been used, less liquid aerosol-forming substrate will be delivered to the heater filaments 36. With less liquid to vaporize, less energy is taken up by the enthalpy of vaporization and more of the energy supplied to the heater filaments 36 is directed to raising the temperature of the heater filaments. Likewise, the energy required for maintaining a target temperature also decreases as the heater filaments 36 dry out. The heater filaments 36 may dry out because the aerosol-forming substrate in the cartridge has been depleted. Alternatively but less likely, the heater filaments 36 may dry out because the user is taking exceptionally long or frequent puffs and the liquid cannot be delivered to the heater filaments 36 as fast as it is being vaporized.

In use, the heater assembly 30 operates by resistive heating. Current is passed through the filaments 36 under the control of control electronics 16, to heat the filaments to within a desired temperature range. The mesh or array of filaments has a significantly higher electrical resistance than the electrical contacts 32 and electrical connectors 19 so that the high temperatures are localised to the filaments. This minimises heat loss to other parts of the aerosol-generating device 10. In this example, the system is configured to generate heat by providing electrical current to the heater assembly 30 in response to a user puff.

The system includes a puff sensor configured to detect when a user is drawing air through the mouthpiece portion. The puff sensor (not illustrated) is connected to the control electronics 16 and the control electronics 16 are configured to supply current to the heater assembly 30 only when it is determined that the user is puffing on the device. Any suitable air flow sensor may be used as a puff sensor, such as a microphone or pressure sensor.

In order to detect an increase temperature of the heater filaments, the electric circuitry 16 is configured to measure the electrical resistance of the heater filaments. The heater filaments in this example are formed from stainless steel, and so have a positive temperature coefficient of resistance. In addition, because heat is generated in short bursts using high current pulses in such puff actuated system, stainless steel filaments having a relatively high specific heat capacity is ideal.

As the temperature of the heater filaments 36 rises so does their electrical resistance. It will be appreciated that in other embodiments the heater filaments 36 may be formed from a material having a negative coefficient of resistance, for which, as the temperature of the heater filaments rises their electrical resistance decreases.

Figure 4:
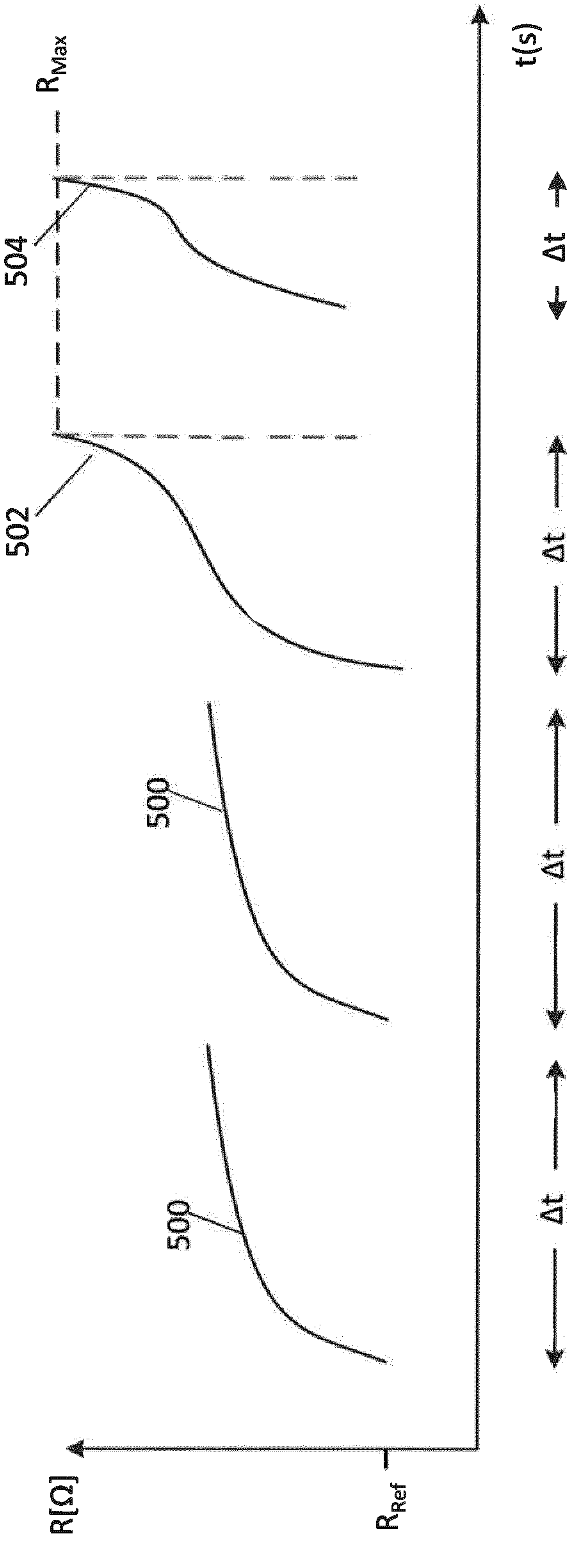
FIG. 4 is a plot showing the change in electrical resistance of the heater assembly during multiple puffs.

FIG. 4 is plot showing the detected change in resistance of the heater during a plurality of heating cycles, each corresponding to a user puff. Each of the heating cycles lasts for a duration $\Delta t$. The x-axis represents time and the y-axis represents detected electrical resistance at the heater assembly 30. As shown in FIG. 4, the change in electrical resistance is detected during a plurality of different heating cycles: 1) during a heating cycle 500 in which the heater filaments 36 are saturated with aerosol-forming substrate, i.e. under normal operating conditions; 2) during a heating cycle 502 in which an insufficient supply of aerosol-forming substrate is provided to the heater filaments 36, i.e. when the liquid substrate is not fully replenished at the heater filaments 36; and 3) during a heating cycle 504 in which the heater filaments are depleted of aerosol-forming substrate.

The heater assembly 30 has an initial resistance $R_{Ref}$. Said initial resistance $R_{Ref}$ is an intrinsic property of the heater assembly 30. It indicates a reference resistance of the heater assembly 30 at room temperature. The initial resistance $R_{Ref}$ is a combination of a parasitic resistance $R_P$ and the resistance of the heater filaments $R_0$ at room temperature. Therefore, $R_0$ can be determined from $R_0=R_{Ref}-R_P$. The parasitic resistance $R_P$ is resistance resulting from the electrical contacts 32 and electrical connectors 19 and the contact between them.

In some cases, the initial resistance $R_{Ref}$ of a new cartridge 20 may be measured at least once before any power is applied. A detection system used to determine when a new cartridge 20 is inserted. In some cases, $R_{Ref}$ may be measured only once for each cartridge. Alternatively, $R_{Ref}$ may be measured each time the system is switched on. In a preferred embodiment, the electric circuitry is configured to periodically take measurements of $R_{Ref}$ predetermined time periods after the supply of power to the heater filaments 36 has been stopped. The predetermined time periods may be around 3 minutes, or any suitable time required for the heater filaments 36 to cool from their operating temperature back to the ambient temperature. Such periodic updates to $R_{Ref}$ can be used to recalibrate the electric circuitry to compensate for changes in ambient temperature, as well as the condition of the heater filaments 36.

As power is applied to the heater assembly 30 during a user puff, the temperature of the heater filaments 36 rises from the ambient temperature. This causes the electrical resistance R of the heater filaments 36 to rise. However, the parasitic resistance $R_P$ is assumed to stay constant. This is because $R_P$ is attributable to non-heated components, such as the electrical contacts 32 and electrical connectors 19. In addition, the value of $R_P$ is assumed to be the same for all cartridges and is not be affected by changing the cartridge. The parasitic resistance $R_P$ value, for a particular aerosol-generating device 20, is stored in the memory of the electric circuitry.

The resistance of the heater filaments 36 is linearly related to its temperature in the temperature range of interest. Therefore by actively measuring the electrical resistance, the electric circuitry is able to determine the heater temperature at the heater assembly 30. As shown in FIG. 4, the electric circuitry ceases heating once the detected electrical resistance R rises above a maximum heater resistance threshold $R_{Max}$. Said maximum heater resistance threshold $R_{Max}$ corresponds to a maximum allowable temperature. Under normal conditions, in which sufficient aerosol-forming substrate is supplied to the heater filaments 36, the heater resistance may not be able to rise above the maximum heater resistance threshold $R_{Max}$. Therefore, the electric circuitry is configured to determine that there is an insufficient supply of aerosol-forming substrate to cool the heater filaments 36 if said maximum heater resistance threshold $R_{Max}$ is reached. This is shown in heating cycles 502 and 504. However, this method requires the heater temperature to rise to an elevated level before an adverse condition can be detected. This may give rise to the generation of undesirable compounds in the generated aerosol.

Figure 5:
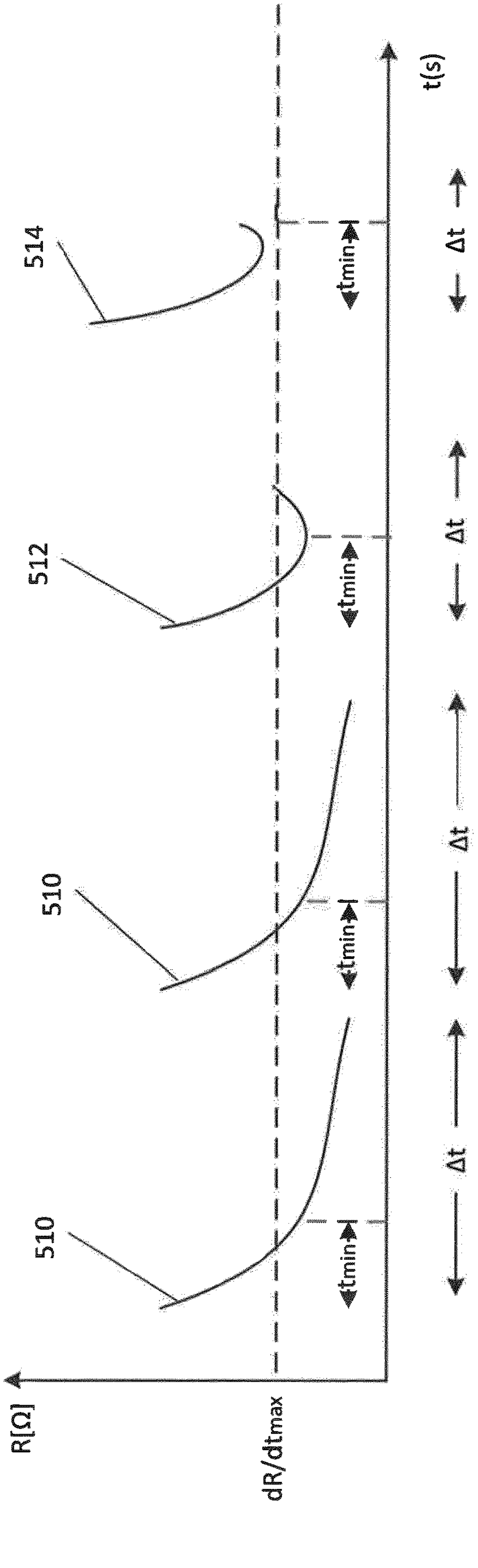
FIG. 5 is a plot showing the first derivative of electrical resistance of the heater assembly with respect to time corresponding to the multiple puffs as shown in FIG. 4.

FIG. 4 not only shows that the heater resistance R rises upon depletion of the aerosol-forming substrate, it also shows that the heater resistance rises R rapidly during the latter part of the puff when there is insufficient aerosol-forming substrate. Therefore, in an embodiment according to the present invention, the depletion of aerosol-forming substrate is determined by monitoring the first derivative of the electrical resistance with respect to time, dR/dt. In other words, this embodiment monitors the rate of change in heater resistance. This is illustrated in FIG. 5, which shows the rate of change of electrical resistance during each of heating cycles 510, 512 and 514, corresponding to heating cycles 500, 502 and 504 in FIG. 4. Depending on the accuracy that is required, the sampling period dt for detecting the change in dR ranges from 1 millisecond to 1 second.

At the start of a puff, the heater assembly 30 is at an ambient temperature. The temperature rises rapidly until vaporisation of aerosol-forming substrate occurs. This period of heating may be referred to as a heating-up phase. Regardless of the amount of the aerosol-forming substrate that is available at the heater filaments 36, all of the heating cycles 510, 512 and 514 exhibit a similar trend where the rate of change of heater resistance reduces steadily throughout the heating-up phase. Therefore, this method may not be reliable enough to determine substrate depletion if it is solely based on analysing the rate of change in electrical resistance detected during the heating-up period. Thus, the electric circuitry is configured to determine if there is an adverse condition only after a predetermined time period $t_{min}$ has lapsed since the beginning of a heating cycle, e.g. since the start of a puff.

After the predetermined time period $t_{min}$ has lapsed, the rates of change in electrical resistance R as detected in different heating cycles 510, 512 and 514 start to differ. In heating cycle 510, the rate of rise of the temperature of the heater filaments 36 slowly reduces. As a result, first derivative of electrical resistance dR/dt gradually declines during the heating cycle.

However if an insufficient supply of aerosol-forming substrate is provided at the heater filaments 36, the rate of increase in electrical resistance rises sharply towards the end of the heating cycle, as shown in heating cycles 512 and 514 in FIG. 5. This is because the vaporised aerosol-forming substrate is not quickly replenished at the heater filaments 36. As such, once the initial aerosol-forming substrate at the heater filaments 36 is vaporised and the amount of substrate at the heater filaments reduces, the temperature at the heater filaments rises rapidly.

As shown in FIG. 5, the electric circuitry is configured to determine dry heater filaments 36 if the first derivative of heater resistance dR/dt rises above a maximum first derivative threshold $dR/dt_{max}$, either immediately upon, or after, the lapse of the predetermined time period. In heating cycle 512, there is an insufficient supply of aerosol-forming substrate. In the first part of the heating cycle there is sufficient aerosol-forming substrate so that after the lapse of the predetermined time period $t_{min}$ the first derivative dR/dt remains below the maximum first derivative threshold $dR/dt_{max}$. However, the aerosol-forming substrate is not replenished quickly enough, so that as the heating cycle progresses the rate of change of temperature of the heater filaments 36 rises again and exceeds the maximum first derivative threshold $dR/dt_{max}$. This indicates an insufficient amount of aerosol-forming substrate at the heater filaments 36.

In contrast, for an empty cartridge or near empty cartridge as illustrated in puff 514, there is only very limited amount of residual aerosol-forming substrate at the heater filaments 36 prior to heating. Therefore upon the lapse of the predetermined time period $t_{min}$, the first derivative dR/dt already exceeds the maximum first derivative threshold $dR/dt_{max}$. As a result the electric circuitry determines an adverse condition immediately after the lapse of the predetermined time period $t_{min}$.

In this embodiment, the electric circuitry is configured to cease power supply to the heater assembly 30 upon detecting that the first derivative of electric resistance dR/dt has exceeded a maximum first derivative threshold $dR/dt_{max}$, either immediately upon, or after, the lapse of the predetermined time period $t_{min}$. Furthermore, or as an alternative, a visual warning, such as a flashing LED signal, may be given to the user to prompt a cartridge replacement. The electric circuitry may not start another heating cycle again until it detects a cartridge replacement has been carried out. This ensures that the user's experience will not be affected by an insufficient supply of liquid substrate, or its complete depletion at the heater filaments 36.

In another embodiment, the electric circuitry does not cease power supply immediately once it has detected the first derivative of electric resistance dR/dt has risen above the maximum first derivative threshold $dR/dt_{max}$. Instead, the electric circuitry may continue power supply for one or more further puffs whilst continuing to determining an adverse condition. The electric circuitry may only confirm such adverse condition once it has determined dry heater filaments 36 over two or more successive heating cycles. This provides a more reliable determination and ensures the user does not discard cartridges unnecessarily.

The aerosol generating system may be used over different periods during a day, or in places with different climatic conditions. Therefore the ambient temperature can vary significantly during use. Since the heating-up phase is the time taken for the heating element to heat up from the ambient temperature, the predetermined time period $t_{min}$ also changes with varying ambient conditions. Thus, the determination of said predetermined time period $t_{min}$ may be actively determined based on a second derivative of the electrical resistance with respect to time. This allows the determination of an adverse condition to commence at the earliest opportunity.

Figure 6:
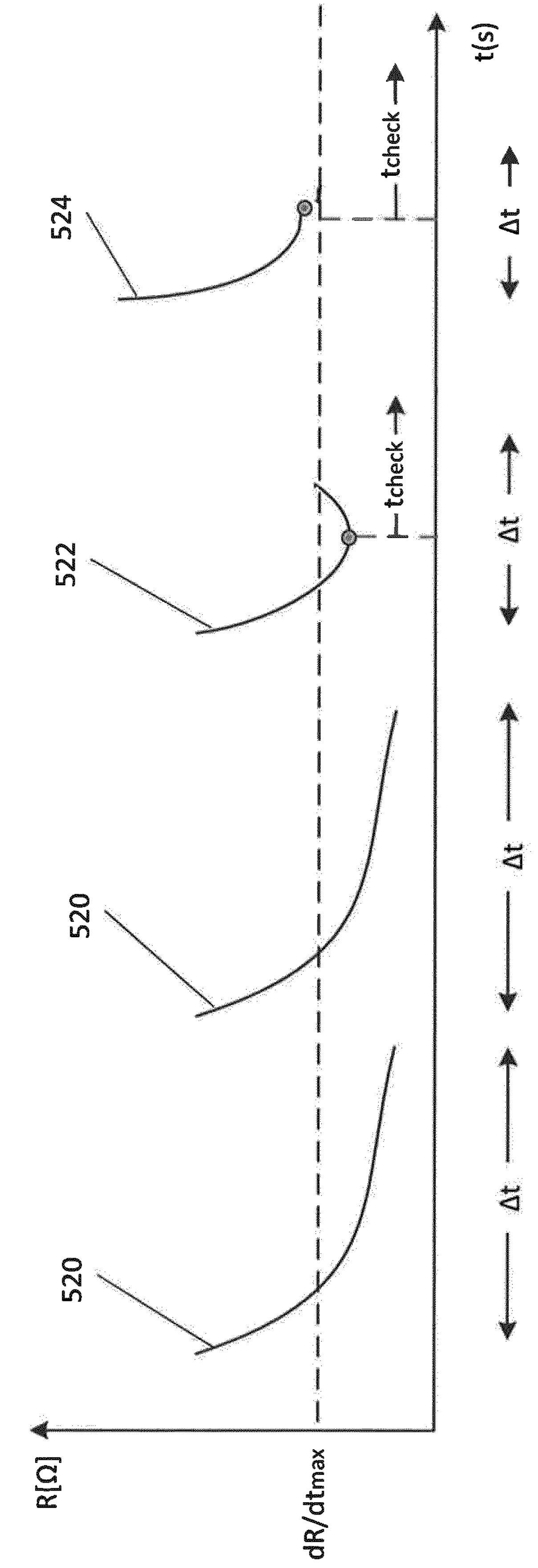
FIG. 6 is a plot showing the first derivative of electrical resistance of the heater assembly with respect to time corresponding to the multiple puffs as shown in FIG. 4.

FIG. 6 shows the first derivative of electrical resistance dR/dt of the heater assembly during heating cycles 520, 522 and 524. Heating cycles 520, 522 and 524 correspond to heating cycles 500, 502 and 504 in FIG. 4 respectively. In this case, the electric circuitry is configured to determine an adverse condition once it detects a second derivative of the electrical resistance $d^2R/dt^2$ with respect to time reaches zero, as indicated by the point $t_{check}$. For example, $t_{check}$ is at a point where no change occurs in the first derivative of heater resistance dR/dt. More specifically, this is the point at which the rate of temperate change begins to rise as a result of the aerosol-forming substrate not be replenished quickly enough to replace the vaporised substrate.

In heating cycle 520, in which the heater filaments 36 are saturated with aerosol-forming substrate, the second derivative $d^2R/dt^2$ does not reach zero before the puff finishes. So the electric circuitry does not need to compare the first derivate with a threshold. Therefore, this method may minimise processing power at the electric circuitry.

In contrast, the second derivative $d^2R/dt^2$ in heating cycle 522 reaches zero at a level below the maximum first derivative threshold $dR/dt_{max}$. As a result the electric circuitry continues to monitor the rise in the first derivative dR/dt until it exceeds the maximum first derivative threshold $dR/dt_{max}$. The electric circuitry then determines a dry heater assembly 30. For heating cycle 522, the application of predetermined time period or second derivative method $d^2R/dt^2$ does not affect the timing of determination of adverse condition.

On the other hand, the application of second derivative method enables the determination of a dry heater assembly 39 in heating 524 to take place sooner. Heating cycle 524 takes place when the cartridge is empty or nearly empty. The electric circuitry is able to determine such adverse condition prior to the lapse of predetermination period $t_{min}$, as shown in heating cycle 514 in FIG. 5. Therefore, the determination of an adverse condition based on the second derivative of electrical resistance $d^2R/dt^2$ enables the power supply to be stopped sooner in the case of an empty or nearly empty cartridge.

In another embodiment, an adverse condition may be determined simply by monitoring the second derivative of electrical resistance $d^2R/dt^2$. As soon as the second derivative has a positive value, greater than zero, an adverse condition can be determined. Again, a positive value of the second derivative over two successive heating cycles may be required before an adverse condition is determined.

Figure 7:
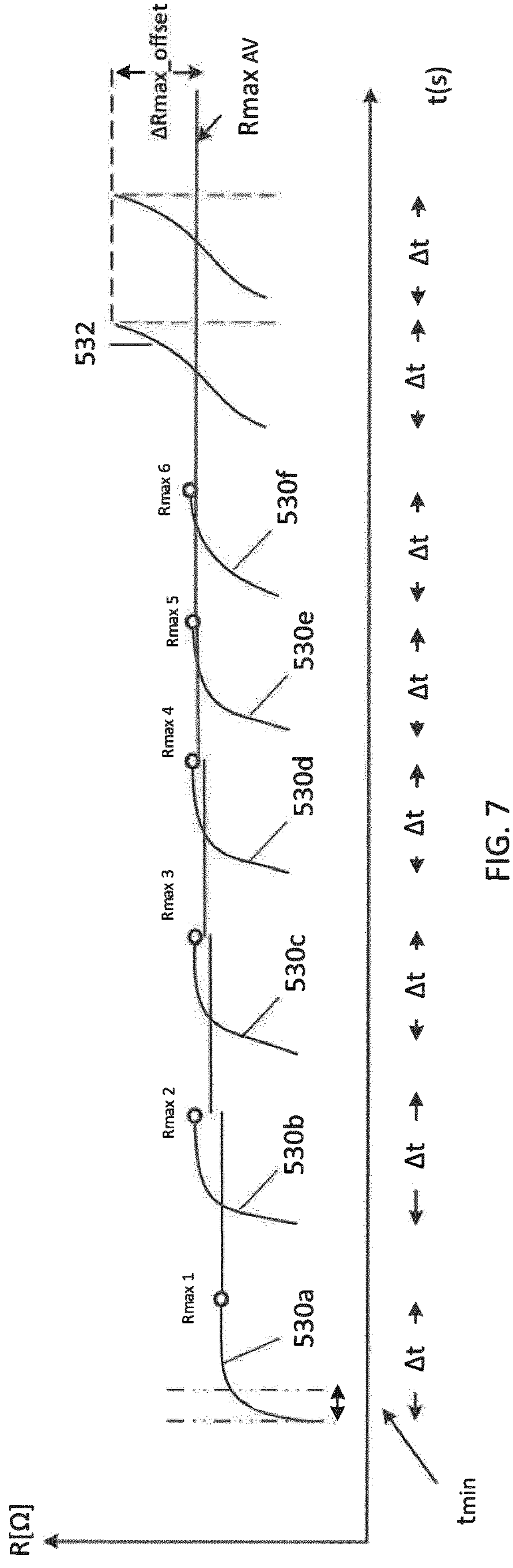
FIG. 7 is a plot showing the increase in maximum electrical resistance of the heater assembly corresponding to a plurality of successive puffs.

In a different embodiment, the electric circuitry determines an adverse condition by comparing the maximum electrical resistance R detected over a plurality of successive puffs. This is illustrated in FIG. 7, which is a plot of the electrical resistance R in a succession of heating cycles. The heating cycles shown in FIG. 7 comprises heating cycles 530*a-f* that take place under normal operating conditions, when the heater filaments 36 are saturated with aerosol-forming substrate, and heating cycle 532 that takes place under an adverse condition, when an insufficient amount of aerosol-forming substrate is provided at the heater filaments 36.

In this embodiment, the electric circuitry detects a maximum electrical resistance $R_{max}$ after the lapse of a predetermined time period $t_{min}$ following the start of the heating cycle. Similar to the embodiment as shown in FIG. 5, the predetermined time period $t_{min}$ begins at the start of the heating cycle. Maximum electrical resistances $R_{max1}$-$R_{max6}$ are each detected in the respective heating cycle 530*a*-530*f*. It can be seen that the maximum electrical resistances $R_{max1}$-$R_{max6}$ increase with each successive heating cycle. This can be attributed to two mechanisms. First, the first puff starts with the heater assembly 30 at an ambient temperature, whilst the successive puffs may begin with the heater assembly 30 at a higher temperature. This is because between successive puffs the heater assembly 30 may not cool to the ambient temperature before the next heating cycle begins. Second, as the aerosol-forming substrate starts to deplete, the flow of substrate to the heater assembly 30 slows down with each successive puffs.

Because of such gradual and progressive increase observed in maximum electrical resistance over successive cycle, there may be no substantial differences in the maximum resistance detected between any two successive puffs. This means the onset of an empty cartridge may not be detectable in some circumstances.

To address this, the electric circuitry determines an adverse condition by comparing a detected maximum electrical resistance $R_{max}$ against a rolling average of maximum electrical resistance $R_{max\_AV}$ as detected in n preceding puffs or heating cycles. More specifically, the electric circuitry determines adverse condition if a difference between the maximum electrical resistance during a heating cycle and the rolling average value ($R_{max}-R_{max\_AV}$) exceeds a predetermined threshold $\Delta R_{max\_offset}$, i.e. $R_{max}>(R_{max\_AV}+\Delta R_{max\_offset})$.

The number of preceding heating cycles n for calculating rolling average $R_{max\_AV}$ in this example is 4. Therefore as shown in FIG. 7, the $R_{max\_AV}$ for heating cycle 532 is an average value of $R_{max3}$, $R_{max4}$, $R_{max5}$ and $R_{max6}$. The electric circuitry compares the maximum electrical resistance $R_{max}$ detected during heating cycle 532 with the rolling average $R_{max\_AV}$, and determines an adverse condition based on the comparison. This is because the maximum resistance $R_{max}$ in this instance exceeds the sum of rolling average and predetermined threshold ($R_{max\_AV}+\Delta R_{max\_offset}$).

Because there is no preceding heating cycle, there is no rolling average $R_{max\_AV}$ for comparison during the first heating cycle 530*a* in the plurality of successive heating cycles. The maximum electrical resistance $R_{max1}$ as detected during the first heating cycle 530*a* then serves as the rolling average $R_{max\_AV}$ for the second heating cycle 530*b*. Whilst the maximum electrical resistance $R_{max1}$ and $R_{max2}$ as respectively detected during the first heating cycle 530*a* and the second heating cycle 530*b* is used for calculating an updated rolling average $R_{max\_AV}$, e.g. $R_{max\_AV}=(R_{max1}+R_{max2})/2$ for the third heating cycle 530*c*. Similarly, the maximum electrical resistance $R_{max1}$, $R_{max2}$, $R_{max3}$ as detected during the first three heating cycles 530*a*-500*c* are used for calculating an updated rolling average $R_{max\_AV}$, e.g. $R_{max\_AV}=(R_{max1}+R_{max2}+R_{max3})/3$ for the fourth heating cycle 530*d*.

Generally, the rolling average $R_{max\_AV}$ for heating cycle P is obtained by $R_{max\_AV}=(R_{max\_P-n}+R_{max\_P-(n-1)}\ \ldots\ R_{max\_P-1})/n$, where P is larger than n.

The application of a rolling average allows the electric circuitry to compare a maximum resistance $R_{max}$ as detected in a heating cycle against an average value that is representative of a number of the preceding heating cycles. This allows small increments as detected in the preceding heating cycles to accumulate and together it enables the electric circuitry to more rapidly detect the depletion of the aerosol-forming substrate.

Moreover, when an air flow passes through the heater assembly it may significantly reduce the measured temperature. Therefore, in all of the above embodiments, the aerosol-generating device further comprises an air flow sensor for detecting an air flow rate during a user puff. The electric circuitry is configured to correct the detected electrical resistance R based on the detected air flow rate. The correction can be done either by a mathematical function, or referring to a look up table, as stored in the memory of the device. This allows the any resistance R to be corrected before they are used for determine an adverse condition. Such correction provides more accurate determination of an adverse condition.

The methods described in the various embodiments may be used in combination with one another or as selectable options within a single system.

The invention claimed is:

1. An electrically operated aerosol-generating system, comprising:
- a heating element configured to heat an aerosol-forming substrate proximate to the heating element;
- a power supply configured to supply power to the heating element; and
- electric circuitry in communication with the heating element and the power supply, the electric circuitry comprising a memory and being configured to:
  - regulate the supply of power to the heating element during a plurality of discrete heating cycles in response to user inputs,
  - determine a maximum electrical resistance of the heating element during each heating cycle,
  - calculate a rolling average value of the maximum electrical resistance of the heating element for n preceding heating cycles, wherein n is an integer greater than 1,
  - compare the maximum electrical resistance of the heating element with the calculated rolling average value,
  - determine an adverse condition when the maximum electrical resistance is greater than the calculated rolling average value by more than a threshold value, the threshold value being stored in the memory, and
  - control the power supplied to the heating element based on whether there is the adverse condition at the heating element or to provide an indication based on whether there is the adverse condition at the heating element.

2. The electrically operated aerosol-generating system according to claim 1, wherein n is between 2 and 5.

3. The electrically operated aerosol-generating system according to claim 1, wherein the electric circuitry is further configured to control power or to provide indication if the adverse condition is determined over two consecutive heating cycles.

4. The electrically operated aerosol-generating system according to claim 1, wherein the electric circuitry is further configured to determine the adverse condition only after a predetermined start time period has lapsed following a start of a heating cycle, the predetermined start time period being stored in the memory.

5. The electrically operated aerosol-generating system according to claim 1,
- further comprising a mouthpiece configured for a user to puff to draw aerosol out of the electrically operated aerosol-generating system,
- wherein the electric circuitry comprises a puff detector configured to detect when the user is puffing on the electrically operated aerosol-generating system as a user input, and
- wherein the electric circuitry is further configured to supply power from the power supply to the heating element when a puff is detected by the puff detector.

6. The electrically operated aerosol-generating system according to claim 1, wherein the electrical circuitry is further configured to determine if there is the adverse condition during said each heating cycle.

7. The electrically operated aerosol-generating system according to claim 1,
- wherein the electric circuitry is further configured to
  - measure an air flow rate of air flow through the electrically operated aerosol-generating system, and
  - adjust electrical resistance measurements or one or more stored threshold values based on the measured air flow rate.

8. The electrically operated aerosol-generating system according to claim 1,
- further comprising a device and a removable cartridge,
- wherein the power supply and the electric circuitry are in the device and the heating element is in the removable cartridge, and
- wherein the cartridge comprises a liquid aerosol-forming substrate.

9. A method of controlling a supply of power to a heating element in an electrically operated aerosol-generating system, comprising:
- regulating the supply of power to the heating element during a plurality of discrete heating cycles in response to user inputs;
- determining a maximum electrical resistance of the heating element during each heating cycle;
- calculating a rolling average value of the maximum electrical resistance of the heating element for n preceding heating cycles, wherein n is an integer greater than 1;
- comparing the maximum electrical resistance of the heating element with the calculated rolling average value;
- determining an adverse condition when the maximum electrical resistance is greater than the calculated rolling average value by more than a threshold value, the threshold value being stored in the memory; and
- controlling the power supplied to the heating element based on whether there is the adverse condition at the heating element or providing an indication based on whether there is the adverse condition at the heating element.

10. A nontransitory computer-readable storage medium having a computer program stored thereon that when executed on an internal memory of a microprocessor comprising software code portions in an electrically operated aerosol-generating system, causes the microprocessor to perform the method according to claim 9, the electrically operated aerosol-generating system comprising a heating element configured to heat an aerosol-forming substrate and a power supply configured to supply power to the heating element, the microprocessor being connected to the electric heater and the power supply, the microprocessor being configured to detect an electrical resistance of the heating element.

* * * * *